Nov. 13, 1923.
W. W. GORE
1,473,786
DUST SPRAYER
Filed July 10, 1922
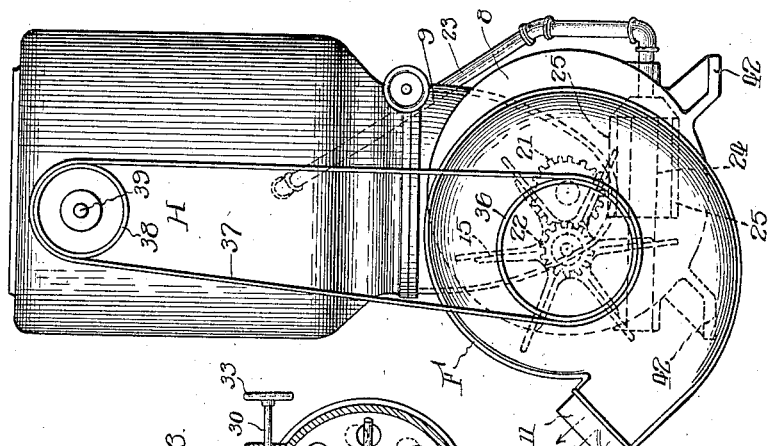
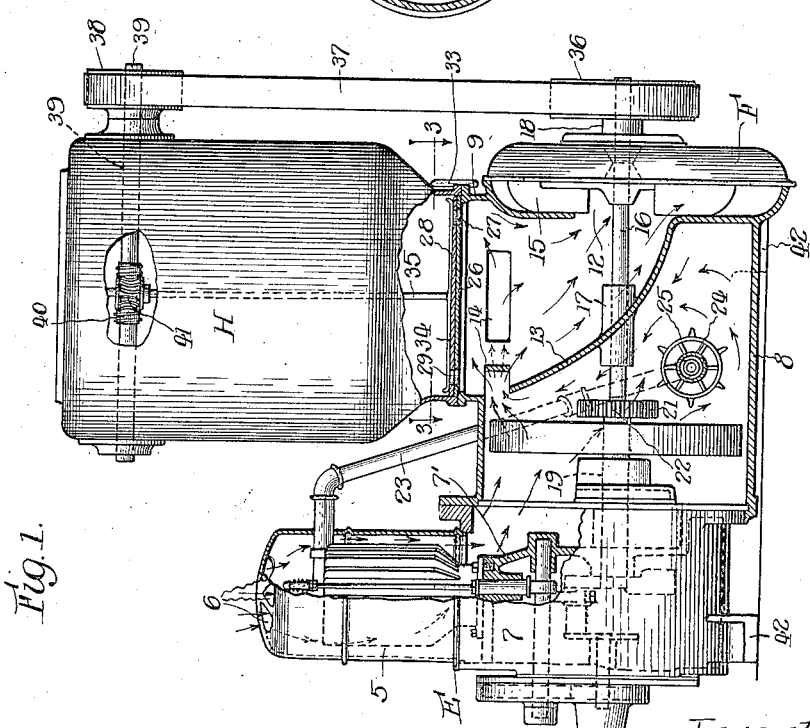
Inventor:
Warren W. Gore,
By Samuel N. Pond,
Atty.
Witness:
A. J. Sauser Patented Nov. 13, 1923.

1,473,786

UNITED STATES PATENT OFFICE.

WARREN W. GORE, OF MADISON, WISCONSIN, ASSIGNOR TO FULLER & JOHNSON MFG. CO., OF MADISON, WISCONSIN, A CORPORATION OF WISCONSIN.

DUST SPRAYER.

Application filed July 10, 1922. Serial No. 574,009.

*To all whom it may concern:*

Be it known that I, WARREN W. GORE, a citizen of the United States, residing at Madison, in the county of Dane and State of Wisconsin, have invented certain new and useful Improvements in Dust Sprayers, of which the following is a specification.

This invention relates to dust-spraying machines of that type which are designed and adapted to spray vermin, fungus and insect-destroying powder on trees, bushes, shrubs and plants through the use of a rotary fan or blower; the machine of the present invention being designed mainly for dusting fruit trees and field crops.

The machine of the present invention in its main structural features closely follows a dust-spraying machine forming the subject matter of a co-pending application filed by me on the 10th day of July, 1922, Serial No. 574,008. In the aforesaid application I have disclosed and claimed a machine comprising essentially a vertical air-cooled gas engine having a hood open on one side and serving to direct a flow of air over the cylinder and crank case, by which the air is heated, a casing attached to the open side of the hood, a rotary fan on the opposite side of the casing, a dust hopper mounted on the casing, a funnel or dust conduit within the casing connecting the discharge of the hopper with the intake of the fan and air-ported to the interior of the casing, and a drive from the engine to the fan comprising a transmission shaft journaled in and across the top of the hopper and belted on one end to the engine shaft and on its opposite end to the fan shaft; the fan drawing the heated air through the dust funnel or conduit together with the powder or dust delivered by the hopper, by which the powder or dust is dried before it is discharged from the spray nozzle or nozzles of the machine. The machine of my present invention embodies the same compact and unitary structure as the machine of the aforesaid application, but presents certain improvements thereon, one of which consists in a means for additionally heating the induced air within the casing between the hood and the fan by means of the exhaust of the engine, and the other of which consists of an improved and more direct drive connection from the engine to the fan.

In order that the invention may be clearly apprehended by persons skilled in the art, I have, in the accompanying drawing, illustrated a practical and approved embodiment thereof; and referring thereto—

Fig. 1 is an elevation partly in vertical section, of the complete outfit;

Fig. 2 is a side elevation of the same, viewed from the right of Fig. 1; and

Fig. 3 is a sectional plan of the discharge valve and agitator of the dust hopper, taken on the line 3—3 of Fig. 1.

Referring to the drawing, E designates as an entirety an upright air-cooled gas engine which may be of any standard and known make, the cylinder of which is surrounded by a hood 5 having air openings 6 in its top and communicating with a hood 7 that partly surrounds the crank case 7', which crank case hood is open on one side (the right as shown in Fig. 1). To this open side of the crank case hood 7 is secured a cylindrical horizontal casing 8 formed on its upper side with a short neck 9 on which is supported and secured the dust hopper H. On the right side of the casing 8 is attached or integrally formed a fan casing F having the usual tangential delivery spout or nozzle 11 to which is attached a hose or discharge pipe (not shown) for carrying the powder-laden blast to the immediate vicinity of the trees, shrubs or field crops being treated. The fan casing F has a central suction opening 12 on its inner side, from which latter is led upwardly to the neck 9 of the casing an intake spout or funnel 13, which latter is provided near its upper end with a series of openings or ports 14 permitting the flow of heated air from the crank case hood of the engine and the interior of the casing 8 into the spout or funnel 13 and thence to the fan. Within the fan casing is a rotary fan 15 fast on a fan shaft 16, which latter is journaled in a bearing 17 formed or mounted in the wall 13 of the dust conduit and in an external bearing 18 on the outer side of the fan casing. The crank shaft 19 of the engine extends within the casing 8 and carries a fly-wheel 20 and also a spur gear 21, which latter meshes with and drives a smaller spur gear 22 fast on the inner end of the fan shaft 16. The gears 21 and 22, as shown, have a substantially two to one ratio, so that the fan 15 is driven at substantially double the speed of the engine shaft.

The exhaust of the engine is delivered through a pipe 23 into and through a horizontal heater pipe 24 which extends across the lower portion of the casing 8, its delivery end lying outside said casing, as shown in Fig. 2. Encircling the heater pipe 24 is a hollow grid structure 25 which is heated by conduction from the pipe 24 and thereby affords an increased area of heating surface to the inflowing air, and hence is preferably, although not necessarily, employed, to transfer the maximum amount of heat from the hot exhaust gases to a portion of the air flowing from around the engine cylinder and crank case into the dust intake spout of the fan.

The ports 14 which direct the heated air into the dust spout or funnel 13 of the fan are located slightly below the throat and discharge mechanism of the hopper H. The present invention is not concerned with any particular structure or type of hopper discharge mechanism, but in Figs. 1 and 3 I have shown a simple mechanism for this purpose capable of being adjusted or graduated so as to vary the amount of dust delivered to the air blast. This mechanism comprises a lower valve plate 26 fitted across the throat of the hopper and formed with a group of equally spaced radial holes 27, and an identical superposed plate or disc 28 formed with holes 29 corresponding in number and location to the holes of the lower plate, so that when the upper plate is revolved the two series of holes can be brought into complete or partial registration or completely occluded. Any desired or convenient means for adjusting the plate 28 may be used, but I have herein shown a horizontal worm shaft 30 carrying a worm 31 in mesh with a worm wheel sector 32 forming part of the periphery of the disc 28; the shaft 30 being equipped with a hand wheel 33.

To insure a continuous and uniform flow of the powder while the machine is in operation, an agitator or stirrer is preferably added to the hopper H, and this may conveniently take the form of a sweep 34 directly overlying the valve plate 28 and fast on the lower end of a vertical shaft 35. This latter shaft is driven from the fan shaft by a pulley 36 on the latter, a belt 37, a pulley 38 on the overhanging end of a shaft 39 journaled in and across the top of the hopper H, a worm 40 on the shaft 39 and a worm wheel 41 fast on the agitator shaft 35.

The parts are so associated and assembled as to constitute a single rigid unitary structure which may conveniently be mounted directly on the floor of a vehicle adapted to be driven through the orchard or crop field; and the structure is conveniently supported on the floor of such a vehicle, or elsewhere, by means of feet 42, one pair of which are formed on the engine crank case hood 7 and the other pair on the lower portion of the casing 8.

The operation or functioning of the apparatus will be quite evident from the foregoing description of its structure. Those advantages which it has in common with the machine of my aforesaid companion application reside partly in the simplicity, compactness and unitary character of the structure, and partly in the preheating of the air which forms the vehicle for the powder or dust as the latter is carried to the points of application. The advantages of the present machine over that disclosed in my aforesaid former application are, first, a higher and more effective preheating of the air by utilizing the heat of the engine exhaust, and a simpler, and more positive and direct drive from the engine to the fan. The heating of the air blast which carries the powder or dust is a feature of great value and advantage in a machine of this character since the effective dusting of the objects treated depends entirely upon having the dust ground very fine so that it will adhere to the foliage and stems of the plants, and as a considerable part of the material used very readily absorbs moisture, some of it being deliquescent, the heated air will absorb any moisture contained in the dust, discharging the latter in a more finely divided condition and better adapted to its purpose. While I have herein shown the heated air and dust as entering the fan together, it is manifest that the heated air might be drawn through the fan and the dust added in the fan discharge pipe.

I claim—

1. In a dusting machine, in combination, an engine, a dust hopper, a fan, a dust delivery conduit between said hopper and fan, said parts being rigidly joined to each other and together forming a single unitary structure, and driving connections from said engine to said fan extending through said dust delivery conduit.

2. In a dusting machine, in combination, an engine, a fan, a casing between and rigidly connecting said engine and fan and having an air intake, a dust hopper mounted on said casing, a dust conduit between said hopper and fan air-ported to said casing, and driving connections from said engine to said fan extending through said casing.

3. In a dusting machine, in combination, an engine, a fan, a casing between and rigidly connecting said engine and fan and having an air intake, a dust hopper mounted on said casing, a dust conduit between said hopper and fan within and air-ported to said casing, and a fan shaft extending through said dust conduit and casing and in driven relation to the shaft of said engine.

4. In a dusting machine, in combination, an engine, a fan, a casing between and rigidly connecting said engine and fan and having an air intake, a dust hopper mounted on said casing, a dust conduit between said hopper and fan within and air-ported to said casing, a fan shaft extending through said dust conduit and casing, and cooperating gears on the adjacent end of the engine shaft and the fan shaft.

5. In a dusting machine, the combination of a gas engine, a fan, a casing located between and rigidly connecting said engine and fan and communicating with the suction side of the latter and with the atmosphere, a dust hopper mounted on and delivering dust into said casing, a heating device in said casing bathed by the air flowing through the latter, a pipe connection from the exhaust of the engine to said heating device, and driving connections from said engine to said fan.

6. In a dusting machine, the combination of a gas engine having a hood open at its upper end for directing a flow of air over the cylinder and crank case thereof, said hood having an open side opposite said crank case, a casing secured to and communicating with the open side of said hood, a fan secured to the opposite side of said casing with its suction opening communicating with the latter, a dust hopper mounted on and delivering dust into said casing, a heating device in said casing bathed by the air flowing through the latter, a pipe connection from the exhaust of the engine to said heating device, and driving connections from said engine to said fan.

7. In a dusting machine, the combination of a gas engine having a hood open at its upper end for directing a flow of air over the cylinder and crank case thereof, said hood having an open side opposite said crank case, a casing secured to and communicating with the open side of said hood, a fan secured to the opposite side of said casing, a dust hopper mounted on said casing, a dust conduit between said hopper and the suction side of said fan within and air-ported to said casing, a heating device in said casing bathed by the air flowing through the latter, a pipe connection from the exhaust of the engine to said heating device, and driving connections from said engine to said fan.

WARREN W. GORE.